(12) United States Patent
Hofsaess et al.

(10) Patent No.: US 8,271,160 B2
(45) Date of Patent: Sep. 18, 2012

(54) METHOD FOR CHECKING THE CORRECT FUNCTIONING OF A COMPONENT IN A VEHICLE

(75) Inventors: Michael Hofsaess, Vaihingen/Enz (DE); Manfred Abendroth, Marbach (DE); Georg Fetzer, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 549 days.

(21) Appl. No.: 12/387,660

(22) Filed: May 5, 2009

(65) Prior Publication Data
US 2009/0306847 A1    Dec. 10, 2009

(30) Foreign Application Priority Data

Jun. 4, 2008 (DE) .......................... 10 2008 002 196

(51) Int. Cl.
*G01M 17/00* (2006.01)
(52) U.S. Cl. ........................................................ 701/29

(58) Field of Classification Search ...................... 701/29
See application file for complete search history.

(56) References Cited

U.S. PATENT DOCUMENTS

| | | | |
|---|---|---|---|
| 6,427,102 B1* | 7/2002 | Ding | 701/34 |
| 6,542,792 B2* | 4/2003 | Schubert et al. | 701/1 |
| 6,856,868 B1* | 2/2005 | Le et al. | 701/38 |
| 7,136,730 B2* | 11/2006 | Lu et al. | 701/36 |
| 7,480,547 B2* | 1/2009 | Brown et al. | 701/1 |
| 2004/0064246 A1* | 4/2004 | Lu et al. | 701/124 |
| 2004/0119335 A1* | 6/2004 | Szabo et al. | 303/147 |
| 2007/0138865 A1* | 6/2007 | Amato | 303/191 |
| 2008/0288148 A1* | 11/2008 | Amato | 701/70 |
| 2008/0319615 A1* | 12/2008 | Bernzen et al. | 701/45 |

* cited by examiner

*Primary Examiner* — Sarah B McPartlin
(74) *Attorney, Agent, or Firm* — Kenyon & Kenyon LLP

(57) ABSTRACT

In a method for checking the proper functioning of a component in a vehicle by evaluating the system state of the component with the aid of a sensor, a state variable is measured first and then the measured state variable is examined for at least one characteristic feature that is descriptive of the system state of the component.

17 Claims, 3 Drawing Sheets

METHOD FOR CHECKING THE CORRECT FUNCTIONING OF A COMPONENT IN A VEHICLE

BACKGROUND OF THE INVENTION

1. Field of the Invention

The present invention relates to a method for checking the correct functioning of a component in a vehicle by evaluating the system state of the component with the aid of a sensor.

2. Description of Related Art

The driving dynamics in motor vehicles can be influenced via ESP systems (electronic stability programs), in particular in order to stabilize the vehicle. ESP systems are active systems, in which measurement data regarding the instantaneous driving state of the vehicle are recorded in a closed-loop control circuit via an ESP sensor system; from these measurement data, actuating signals to be applied to actuators in the vehicle are generated in a control device, for instance for the purpose of controlling the wheel brakes or the engine control. The ESP sensor system involves inertial sensors such as acceleration sensors for measuring the linear and transverse acceleration, and a rate-of-rotation sensor for measuring the vehicle yaw rate. To be able to carry out the interventions in the driving dynamics of the vehicle in highly precise manner, exact knowledge of the instantaneous driving state of the vehicle is required for one, and the parameters of active and passive components in the vehicle must likewise be known as accurately as possible for another, especially components that are part of the ESP system or are controlled by it.

BRIEF SUMMARY OF THE INVENTION

An object of the present invention is to provide a method in which data describing the system state of a component in a vehicle are provided with the least possible degree of sensor complexity.

The method of the present invention is used for ESP systems, for example, but is not limited to such systems. In principle, use in other automotive systems that have at least one sensor for measuring a driving state variable is conceivable as well.

The method according to the present invention is based on the idea of inferring the system state of a component from a measured state variable, although the system state is not measured directly via the sensor system. To obtain information about the system state nevertheless, the measured state variable is analyzed and evaluated, the state variable being examined for the presence of at least one characteristic feature that is descriptive of the system state of the component. The influence of the component on the measured state variable manifests itself in the characteristic feature, which is able to be detected through the use of appropriate methods of analysis. This makes it possible to obtain additional information about the instantaneous system state of the component in question. The characteristic feature represents an effect of the component on the characteristic of the measured state variable. For example, a mechanical positioning movement of a component may have an effect on the acceleration characteristic, which is able to be detected as characteristic feature.

The characteristic feature may be determined in a variety of ways. According to one advantageous development, the characteristic feature is determined in a reference measurement, which preferably takes place during a defined operating state of the vehicle and/or the component to be measured. This defined operating state may either be a particular driving situation, e.g., a particular driving maneuver such as a braking operation or a steering operation. However, another possibility is a selective triggering of an actuator in the vehicle in order to cause a response either of the actuator itself or of a component affected by the actuator movement, which manifests itself in the characteristic of the measured state variable. For example, a control valve in the vehicle is triggered and actuated via a control device; the actuating movement of the valve body mechanically propagates inside the vehicle, which may be detected as characteristic feature by the sensor system, preferably in the characteristic of the acceleration.

After the characteristic feature has been defined and specified with the aid of specific variables such as amplitude and frequency during a reference measurement, for instance, the data obtained in this way such as valve switching instants may be processed directly, for one, which already leads to increased actuating precision in the actuation of a control system. For another, the characteristic feature may be identified in the characteristic of the measured sensor values at any time as soon as the particular component executes a corresponding movement. Thus, even without knowledge of the instant of the component response, it is possible to identify it.

An additional advantage is that a change in the response of the component is able to be detected by comparing the actually generated response with the characteristic feature that is considered to be the setpoint value. This makes it possible to detect a weakening of the function due to contamination or ageing, for instance. The detection of a shift in switching instants in actuating valves, for instance, is another possibility.

As a rule, however, it is also possible to determine or specify the characteristic feature not in a reference measurement, but to specify it from an already existing data set and store it in a regulation or control device.

The method according to the present invention may be used for a wide variety of components in the vehicle, provided they have an effect on the monitored state variable recorded by the sensor. The component may be an active component, e.g., the previously described actuating valve, or also a passive component, which, however, is able to be re-set via external influences, such as damping elements that undergo an adjustment movement during the driving operation or in response to the operation of an active actuating element in the vehicle. Other active components could be, for example, electric pumps in the vehicle, the actuation of the pump motor causing vibrations or abrupt changes in the torque, which manifest themselves as characteristic feature in the characteristic of the measured state variable, in particular an acceleration variable. Uneven running of the pump motor, which causes an unbalance, may thus be identified as characteristic feature.

The passive components may preferably be spring elements or damping elements, in particular damping elements in the region of the suspension of the ESP system, the ESP system being made up of a control device into which an inertial sensor system is integrated, a hydraulic power unit and a motor. Vibrations may be produced in an actuation of the ESP system by the pump motor as a function of the engine speed, and also the previously mentioned abrupt torque changes; the rotational speed of the pump is able to be determined by the method according to the present invention, so that a more precise regulation is possible than by measuring the self-induction voltage. Since no action on the magnetic field of the motor winding is required because of the identification of the engine speed of the pump by the acceleration measurement, a virtually constant motor current is able to be set, which reduces the stressing of the switching elements. In addition, the reduction of torque peaks also reduces the noise level.

For another, when the pump motor starts up, a rotary motion of the damping element as component of the suspension of the ESP system is able to be identified, which motion is generated by the startup jerk of the pump motor and may be identified as characteristic feature, especially in the characteristic of a measured rate of rotation. If the characteristic feature of the damping element changes in one or more parameters, then this points to a malfunction of the damping element, in particular wear or incorrect installation.

The method of the present invention is preferably implemented in a regulation or control device in the vehicle. In an advantageous manner, it is part of an ESP system.

DETAILED DESCRIPTION

Figure 1:
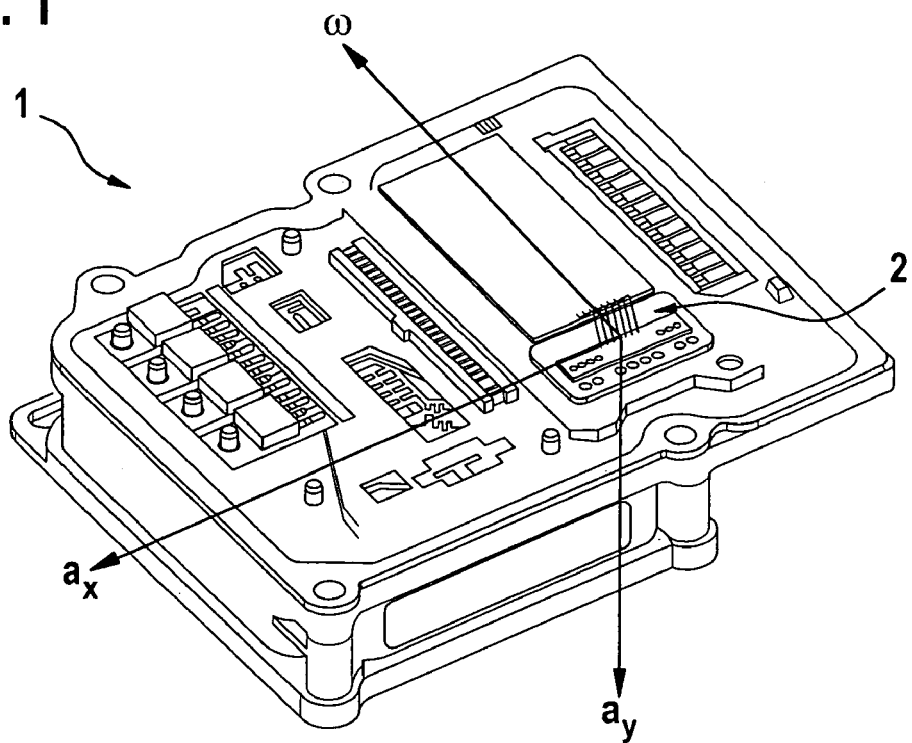
FIG. 1 shows in a perspective view, an ESP regulation or control device, into which an inertial sensor system is integrated for measuring the linear acceleration, the transverse acceleration and the rate of rotation.

FIG. 1 shows a regulation or control device 1 for an ESP system, by which at least one actuator in the vehicle is adjusted to influence the vehicle dynamics. Regulation or control device 1 is equipped with an inertial sensor system 2, which makes it possible to measure linear acceleration $a_x$ of the vehicle, transverse acceleration $a_y$ as well as the rate of rotation $\omega$. The measured values of inertial sensor system 2 are processed in regulation or control device 1 and may be stored in a memory unit.

Figure 2:
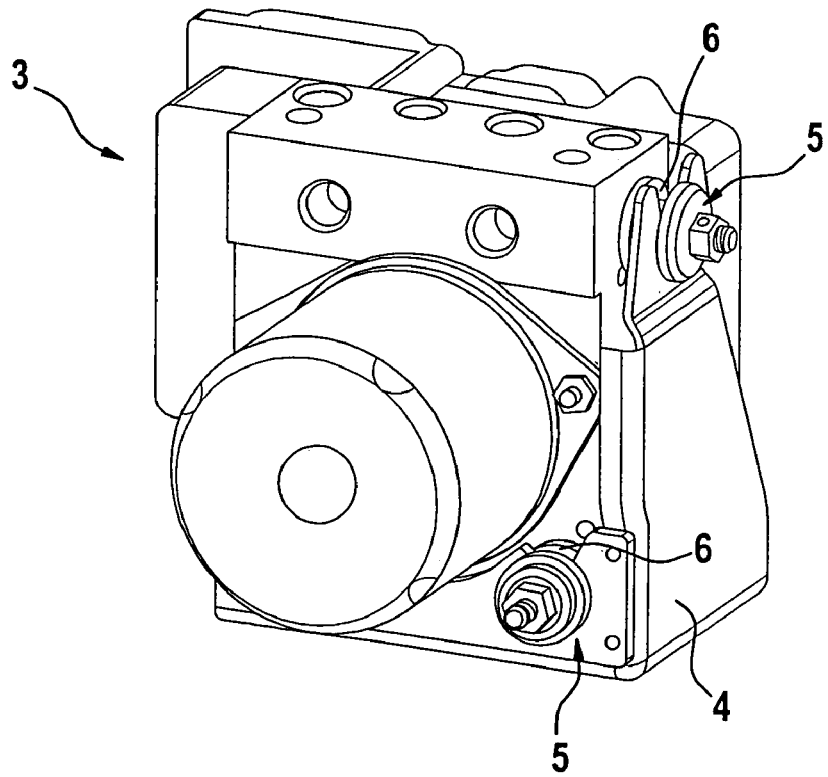
FIG. 2 shows a perspective illustration of an ESP system, which is connected to the vehicle body or a fixed vehicle body component, via a suspension provided with damping elements.

FIG. 2 shows an ESP system 3 in its installation position; in addition to regulation or control device 1 shown in FIG. 1, ESP system 3 also includes an electric pump motor and a hydraulic power unit. ESP system 3 is held in place on a body-mounted vehicle component 4 via affixation devices 5, each affixation device 5 including a damping element 6, which may have damping as well as elastic properties. Via damping elements 6, vibrations and jerks emanating from the vehicle or acting on it are transmitted to ESP system 3 in damped fashion only. Vice versa, vibrations and oscillations caused by the operation of the ESP system, in particular the motor, are likewise transmitted to body-mounted vehicle component 4 only in damped fashion.

Figure 3:
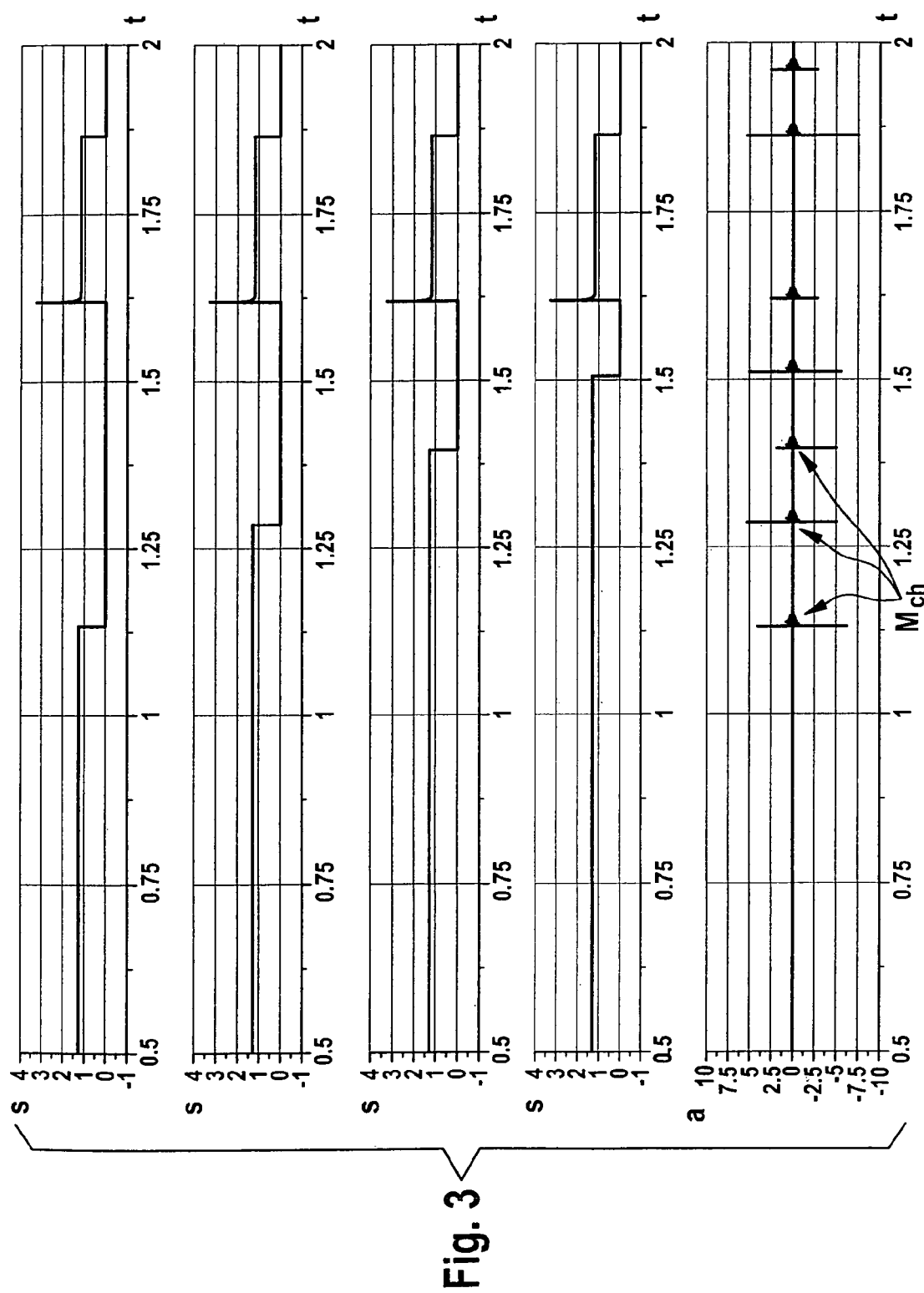
FIG. 3 shows different characteristics of the valve lift of a total of four actuating valves, and the effect of the positioning movement of the valves on the acceleration characteristic.

FIG. 3 illustrates different curve characteristics, the upper four curve characteristics in each case showing valve lift s of a control valve in the vehicle as a function of the time, and the last curve showing an ESP system acceleration a as a function of the time. As can be gathered from the characteristic of the valve lift curves, the individual valves are switched at different instants, whereby the valve body of the corresponding control valve is adjusted between a first position and a second position. These valves may be electromagnetic valves by way of example, their valve bodies being either closed or open.

Whenever the valve body is brought from one valve position into the other valve position, a mechanical push is produced, which manifests itself as interference in measured acceleration characteristic a, e.g., in the linear acceleration or the transverse acceleration. This interference in the curve of measured acceleration a may be specified as characteristic feature $M_{ch}$, which manifests itself in the measuring characteristic and is descriptive of the system state of the component. In the exemplary embodiment shown, an abrupt valve change may be assumed upon each occurrence of a characteristic feature $M_{ch}$. Moreover, via additional defining parameters of characteristic feature $M_{ch}$, in particular the amplitude, the amplitude characteristic as well as the frequency characteristic, further characteristics of the particular control valve may be inferred. If measured characteristic feature $M_{ch}$ shows a significant deviation in a parameter from a corresponding setpoint value, then a malfunction of the particular control valve may be inferred, which could be traced to wear of this valve, for example.

The valve lift curves may be generated during a reference measurement, thereby making it possible to define characteristic setpoint features, which are stored in the regulation or control device of the ESP system. These setpoint features serve as reference for later comparisons, when additional measuring series of the acceleration are produced and corresponding characteristic features are determined in the characteristic of the acceleration.

Figure 4:
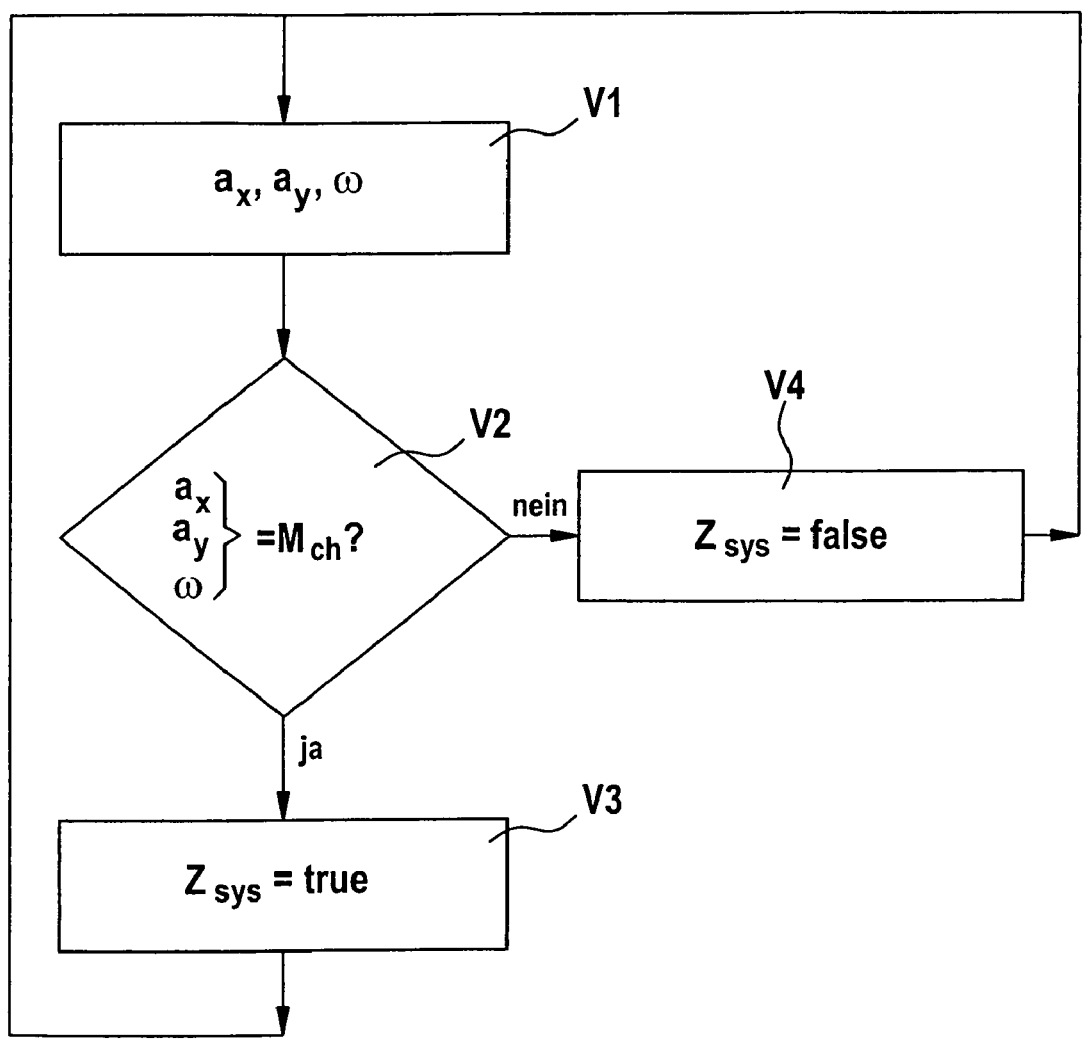
FIG. 4 shows a flow chart for implementing the method of the present invention.

FIG. 4 shows a considerably simplified flow chart for implementing the method. According to method step V1, first linear acceleration $a_x$, transverse acceleration $a_y$, and rate of rotation $\omega$ of the vehicle are measured via the inertial sensors of the ESP system. In a next method step V2, at least one of these measuring series, but possibly several or all measuring series, are then checked with regard to the presence of a characteristic feature $M_{ch}$. Depending on the measured state variable, different characteristic features with regard to which the particular measuring series is examined may be defined. Moreover, it is possible to define different characteristic features also for a single state variable, so that a query for different characteristic features $M_{ch}$ is performed for each measuring series of a state variable.

If it is determined in the query according to V2 that a characteristic feature is actually found in the measured curve characteristic of a state variable, then it is proceeded by next method step V3, according to which preferably a logic variable $Z_{Sys}$, which generally stands for the system state of the examined component, is set to the value "true"; the signal generated in this manner is able to be processed further, in particular in the regulation or control device, where additional queries are performed, if warranted. These further queries may pertain to deviations between individual parameters of the characteristic feature and setpoint parameters. If the additional query shows that the deviation exceeds a permissible limit, then a fault signal may be generated.

The knowledge that a characteristic feature is present may already be used for adjusting the ESP system or one of the other vehicle systems. For instance, the precise knowledge of a switching instant of a control valve is advantageous for the precision of the regulation in a vehicle dynamics control system.

However, if the query in method step V2 shows that no characteristic feature is present in one of the measured curve characteristics, then logic variable $Z_{Sys}$ is set to the value "false", which is likewise able to be processed further in suitable manner if required. The value can be stored for protocol purposes. Then, a return to the start of the method takes place, and the entire method is run through again at cyclical intervals.

What is claimed is:

1. A computer-implemented method for checking the proper functioning of a component in a vehicle by evaluating the system state of the component, the method comprising:
   measuring at least one state variable of the component, wherein the at least one state variable includes at least one of linear acceleration, transverse acceleration, and rate of rotation; and
   checking, using the computer, the at least one measured state variable for the presence of at least one characteristic feature descriptive of the system state of the component, wherein the amplitude of the at least one measured state variable is checked as the at least one characteristic feature.

2. The method as recited in claim 1, wherein the at least one characteristic feature is determined in a reference measurement.

3. The method as recited in claim 2, wherein to determine the at least one characteristic feature in the reference measurement, the component is adjusted to modify the system state of the component.

4. The method as recited in claim 3, wherein the at least one measured state variable is checked at regular intervals for the presence of the at least one characteristic feature.

5. The method as recited in claim 4, wherein the at least one measured state variable is linear acceleration.

6. The method as recited in claim 4, wherein the at least one measure state variable is rate of rotation.

7. The method as recited in claim 1, wherein the system state of a damping element in the vehicle is determined.

8. The method as recited in claim 7, wherein a rotary motion of the damping element as a result of a start-up of a pump motor is identified via the at least one characteristic feature.

9. A computer-implemented method for checking the proper functioning of a component in a vehicle by evaluating the system state of the component, the method comprising:
   measuring at least one state variable of the component, wherein the at least one state variable includes at least one of linear acceleration, transverse acceleration, and rate of rotation; and
   checking, using the computer, the at least one measured state variable for the presence of at least one characteristic feature descriptive of the system state of the component;
   wherein the at least one measured state variable is checked at regular intervals for the presence of the at least one characteristic feature, and
   wherein the frequency of the at least one measured state variable is checked as the at least one characteristic feature.

10. A computer-implemented method for checking the proper functioning of a component in a vehicle by evaluating the system state of the component, the method comprising:
    measuring at least one state variable of the component, wherein the at least one state variable includes at least one of linear acceleration, transverse acceleration, and rate of rotation; and
    checking, using the computer, the at least one measured state variable for the presence of at least one characteristic feature descriptive of the system state of the component;
    wherein the at least one measured state variable is checked at regular intervals for the presence of the at least one characteristic feature and
    wherein the time interval between two successive amplitudes in the at least one measured state variable is checked as the at least one characteristic feature.

11. The method as recited in claim 10, wherein the system state of a control valve in the vehicle is determined.

12. The method as recited in claim 11, wherein a valve body of the control valve is adjusted based on signals from a control device, and wherein the effect of valve body deflection on the at least one measured state variable is checked.

13. The method as recited in claim 10, wherein the system state of an electric pump in the vehicle is determined.

14. The method as recited in claim 13, wherein at least one of a vibration of the pump motor, an abrupt torque change, an irregular operation of the pump motor, and irregular rotational frequency of the pump motor is identified via the at least one characteristic feature.

15. A control device for checking the proper functioning of a component in a vehicle by evaluating the system state of the component, comprising:
    a sensor configured to measure at least one state variable of the component, wherein the at least one state variable includes at least one of linear acceleration, transverse acceleration, and rate of rotation; and
    an arrangement configured to check the at least one measured state variable for the presence of at least one characteristic feature descriptive of the system state of the component;
    wherein the at least one measured state variable is checked at regular intervals for the presence of the at least one characteristic feature, and
    wherein the amplitude of the at least one measured state variable is checked as the at least one characteristic feature.

16. A control device for checking the proper functioning of a component in a vehicle by evaluating the system state of the component, comprising:
    a sensor configured to measure at least one state variable of the component, wherein the at least one state variable includes at least one of linear acceleration, transverse acceleration, and rate of rotation; and
    an arrangement configured to check the at least one measured state variable for the presence of at least one characteristic feature descriptive of the system state of the component;
    wherein the at least one measured state variable is checked at regular intervals for the presence of the at least one characteristic feature, and
    wherein the frequency of the at least one measured state variable is checked as the at least one characteristic feature.

17. A control device for checking the proper functioning of a component in a vehicle by evaluating the system state of the component, comprising:
    a sensor configured to measure at least one state variable of the component, wherein the at least one state variable includes at least one of linear acceleration, transverse acceleration, and rate of rotation; and
    an arrangement configured to check the at least one measured state variable for the presence of at least one characteristic feature descriptive of the system state of the component;
    wherein the at least one measured state variable is checked at regular intervals for the presence of the at least one characteristic feature, and
    wherein the time interval between two successive amplitudes in the at least one measured state variable is checked as the at least one characteristic feature.

* * * * *